Oct. 7, 1924.  
E. MURRAY  
BLOCK CONVEYER  
Filed May 4, 1923
1,510,694
2 Sheets-Sheet 1
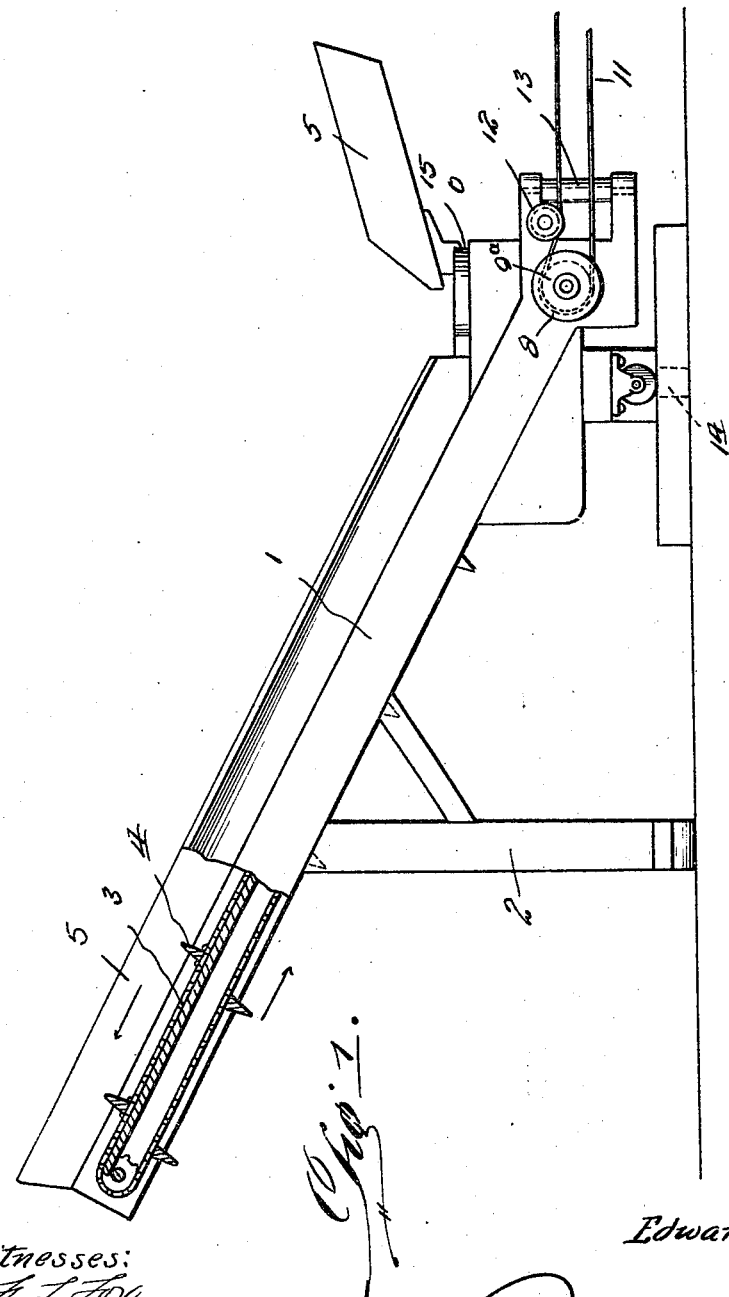
Witnesses:  
Edward Murray,  
Inventor

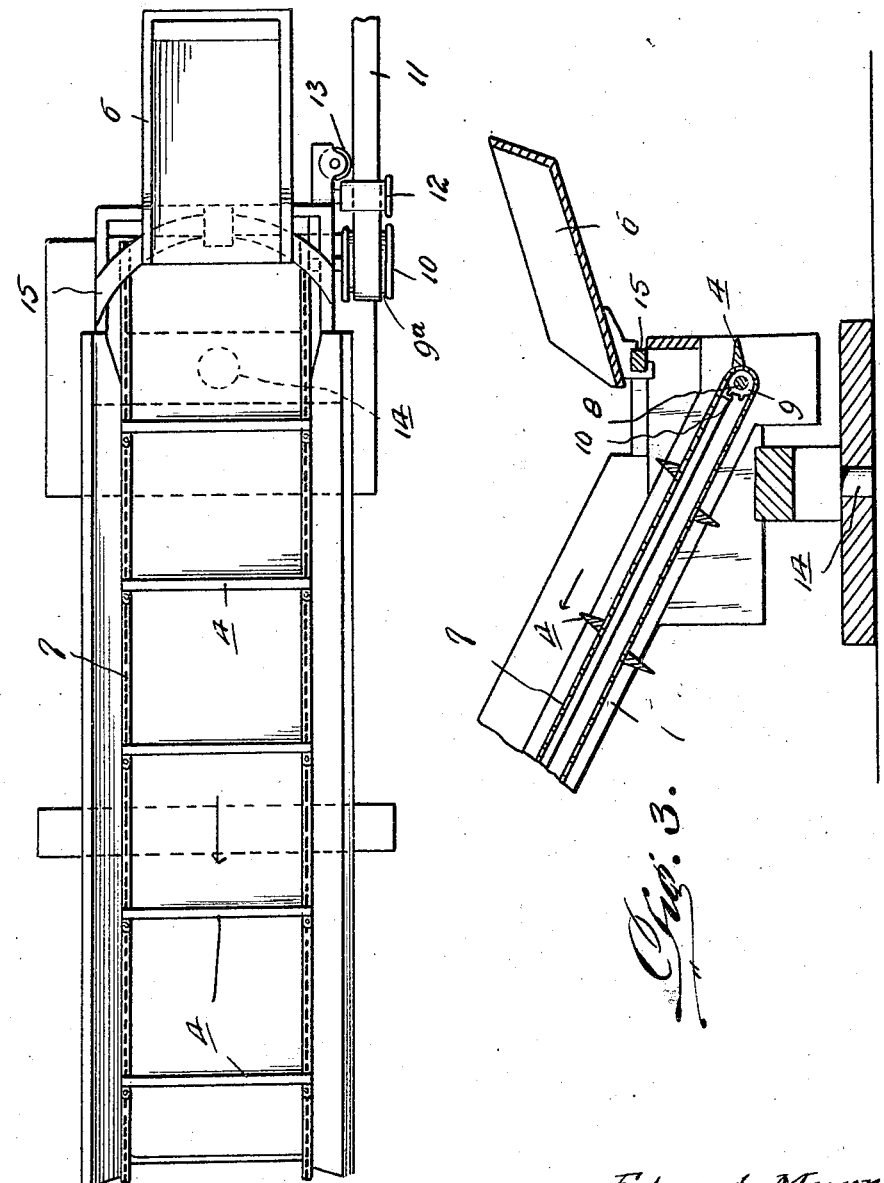

Patented Oct. 7, 1924.

1,510,694

UNITED STATES PATENT OFFICE.

EDWARD MURRAY, OF CLOQUET, MINNESOTA.

BLOCK CONVEYER.

Application filed May 4, 1923. Serial No. 636,560.

*To all whom it may concern:*

Be it known that I, EDWARD MURRAY, a citizen of the United States, residing at Cloquet, in the county of Carlton and State of Minnesota, have invented certain new and useful Improvements in Block Conveyers, of which the following is a specification.

This invention relates to a device which is adapted to be used in conjunction with a wood sawing machine, and it has more particular reference to a device which may be conveniently termed as a block conveyer, the same being adapted to convey the cut blocks or sticks of wood to an appropriate place of deposit.

The invention will be best understood from a consideration of the following detailed description, taken in connection with the accompanying drawings forming a part of this specification, with the understanding that the invention is not confined to any strict conformity with the showing of the drawings, but may be changed and modified as long as such changes and modifications mark no material departure from the salient features of the invention as expressed in the appended claim.

In the drawings:

Figure 1 is an elevation, with parts broken away and shown in section, of a delivery hopper for the sticks of wood, and an elevating conveyer for delivering the cut sticks of wood to a point of deposit.

Figure 2 is a plan view of the structure shown in Figure 1.

Figure 3 is a longitudinal section of the delivery hopper and elevating conveyer associated therewith.

Referring to the drawings in detail it will be seen that the reference character 1 designates a conveyer supporting frame which is maintained in an inclined position through the medium of a supporting prop 2 which is longitudinally adjustable to vary the elevation of the frame.

The elevating conveyer within the frame comprises an endless belt 3 carrying flights 4, and operating between flaring guides 5 constituting guards for the retention of the sticks of wood delivered on the conveyer 3.

Leading to the conveyer 3 at the lower end thereof is a chute 6 for delivering the wood as cut to the conveyer in a downward direction.

The elevating conveyer belt 3 is composed of two parallel strands 7 with cross flights 4, before referred to, and passing about guiding rollers 8 on which are mounted sprocket wheels 9 having teeth 10 thereon by means of which the conveyer 3 may be actuated through the intermediary of driven rollers $9^a$ having side flanges 10 thereon.

The roller $9^a$ is driven by a power belt 11, which may receive motion from any suitable source. The belt 11 is maintained in its proper course by guiding rollers 12 and 13, which prevent, in conjunction with the roller $9^a$, the running of the belt 11 from engagement with the latter.

The lower end of the elevating conveyer 3 is pivoted at 14 upon a base, disposed below the lower end of the conveyer 1, and is capable of being moved about the pivot 14, so that the direction of discharge of the wood reaching the conveyer 3 may be changed in accordance with the desires of the operator, there being provided an arcuate-shaped guide 15, for the lower end of the conveyer about the pivot 14. It is to be observed that recessed blocks are secured to the under side of the chute 6 and cooperate with the arcuate guide 15 as shown in the drawing.

The chute 6 is designed to receive blocks of wood from a saw and after such blocks of wood are deposited in said chute they are delivered to the lower or receiving end of the conveyer and then carried to different elevated positions by the conveyer at a high point for utilization or for being piled in different positions, such positions varying in accordance with the relation of the chute 6 to the conveyer 3.

Having thus described my invention, what I claim as new, and desire to secure by Letters-Patent, is:

A block conveyer comprising a platform, an inclined conveyer frame pivotally mounted at its lower end upon the platform, a supporting prop attached to the intermediate portion of the conveyer frame and depending therefrom, an arcuate guide mounted at the lower end of the conveyer frame and disposed concentrically with relation to the axis of the pivot upon which the frame is mounted for turning movement, a chute disposed over the arcuate guide and having its bottom inclined downwardly toward the pivot of the frame, a recessed block carried by the under side of the chute, the arcuate guide being slidably received in the recess of said block, a shaft journaled at the lower end of the frame, a belt mounted for orbital movement along the frame and around said shaft, a driving belt trained around said shaft and a guiding roller journaled at the lower end of the frame upon an axis disposed parallel with the axis of said pivot and bearing against the edge of the driving belt.

In testimony whereof I affix my signature.

EDWARD MURRAY.